United States Patent
Fukuchi et al.

(10) Patent No.: US 7,294,284 B2
(45) Date of Patent: Nov. 13, 2007

(54) METHOD FOR PRODUCING MN-ZN FERRITE

(75) Inventors: Eiichiro Fukuchi, Tokyo (JP); Akira Kakinuma, Tokyo (JP); Kenya Takagawa, Tokyo (JP); Fumitaka Baba, Tokyo (JP); Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 333 days.

(21) Appl. No.: 11/035,877

(22) Filed: Jan. 10, 2005

(65) Prior Publication Data

US 2005/0167632 A1    Aug. 4, 2005

(30) Foreign Application Priority Data

Jan. 30, 2004  (JP) .............................. 2004-022453

(51) Int. Cl.
*H01F 1/34*    (2006.01)
(52) U.S. Cl. .................................... 252/62.62; 264/611
(58) Field of Classification Search ............. 252/62.62; 264/611
See application file for complete search history.

(56) References Cited

U.S. PATENT DOCUMENTS

| | | | | |
|---|---|---|---|---|
| 4,267,065 | A * | 5/1981 | Johnson et al. | 252/62.62 |
| 6,174,453 | B1 | 1/2001 | Harada | 252/62.54 |
| 6,391,222 | B1 | 5/2002 | Watanabe | 252/62.59 |
| 6,627,103 | B2 * | 9/2003 | Yasuhara et al. | 252/62.62 |
| 2006/0045839 | A1 * | 3/2006 | Takagawa et al. | 423/594.1 |

FOREIGN PATENT DOCUMENTS

| | | |
|---|---|---|
| JP | 56-005331 | 1/1981 |
| JP | 06-059241 | 3/1988 |
| JP | 08-169756 | 7/1996 |
| JP | 10-064715 | 3/1998 |
| JP | 10-270229 | 10/1998 |
| JP | 10-270231 | 10/1998 |
| JP | 11-003813 | 1/1999 |
| JP | 11-329822 | 11/1999 |
| JP | 2000-159523 | 6/2000 |
| JP | 2000-200715 | 7/2000 |
| JP | 2000-286119 | 10/2000 |
| JP | 2001-080952 | 3/2001 |
| JP | 2001-110624 | 4/2001 |
| TW | 467816 | 12/2001 |
| TW | 483009 | 4/2002 |
| WO | WO 2004/063117 | * 7/2004 |

* cited by examiner

*Primary Examiner*—C. Melissa Koslow
(74) *Attorney, Agent, or Firm*—Hogan & Hartson LLP (57) ABSTRACT

The present invention provides a Mn—Zn ferrite which is low in the loss in the frequency range between a few 10 kHz and a few 100 kHz and high in the saturation magnetic flux density in the vicinity of 100° C. The present invention comprising the steps of compacting a powder having a specific surface area (based on the BET method) of 2.0 to 5.0 $m^2/g$ and a 50% particle size of 0.7 to 2.0 μm into a compacted body having a predetermined shape and obtaining a sintered body by sintering the compacted body. It is preferable that a Mn—Zn ferrite comprises, as main constituents, 54 to 57 mol % of $Fe_2O_3$, 5 to 10 mol % of ZnO, 4 mol % or less (not inclusive of 0%) of NiO, and the balance substantially being MnO.

19 Claims, 11 Drawing Sheets

FIG. 1

| Sample No. | Fe$_2$O$_3$ [mol%] | MnO [mol%] | ZnO [mol%] | NiO [mol%] | SiO$_2$ [ppm] | CaCO$_3$ [ppm] | Nb$_2$O$_5$ [ppm] | ZrO$_2$ [ppm] | CoO [ppm] | Calcining temperature [°C] | Milling time [hr] | BET [m$^2$/g] | 50% particle size [μm] | 90% particle size [μm] |
|---|---|---|---|---|---|---|---|---|---|---|---|---|---|---|
| 1 | 55.1 | 35.7 | 7.4 | 1.8 | 100 | 1000 | 300 | 120 | 1000 | 750 | 4 | 3.173 | 0.989 | 1.824 |
| 2 | | | | | | | | | | 750 | 12 | 3.749 | 0.834 | 1.241 |
| 3 | | | | | | | | | | 850 | 2 | 1.852 | 1.736 | 3.411 |
| 4 | | | | | | | | | | 850 | 8 | 2.312 | 1.293 | 2.154 |
| 5 | | | | | | | | | | 850 | 12 | 2.583 | 1.237 | 1.996 |
| 6 | | | | | | | | | | 850 | 32 | 4.642 | 0.883 | 1.255 |
| 7 | | | | | | | | | | 950 | 2 | 1.244 | 2.639 | 4.568 |
| 8 | | | | | | | | | | 950 | 8 | 1.755 | 1.647 | 2.638 |
| 9 | | | | | | | | | | 950 | 16 | 2.463 | 1.392 | 2.252 |
| 10 | 55.1 | 35.7 | 7.4 | 1.8 | 100 | 1000 | 300 | 120 | 1000 | 750 | 4 | 3.173 | 0.989 | 1.824 |
| 11 | | | | | | | | | | 750 | 8 | 3.680 | 0.864 | 1.300 |
| 12 | | | | | | | | | | 750 | 32 | 5.614 | 0.684 | 0.955 |
| 13 | | | | | | | | | | 850 | 2 | 1.852 | 1.736 | 3.411 |
| 14 | | | | | | | | | | 850 | 4 | 1.856 | 1.518 | 2.719 |
| 15 | | | | | | | | | | 850 | 8 | 2.312 | 1.293 | 2.154 |
| 16 | | | | | | | | | | 850 | 32 | 4.642 | 0.883 | 1.255 |
| 17 | | | | | | | | | | 950 | 2 | 1.244 | 2.639 | 4.568 |
| 18 | | | | | | | | | | 950 | 4 | 1.487 | 1.971 | 3.322 |
| 19 | | | | | | | | | | 950 | 16 | 2.463 | 1.392 | 2.252 |

FIG. 2

| Sample No. | Sintering conditions | Density of sintered body [Mg/m³] | Mean grain size [μm] | $\mu i$ | Bs [mT] | | | Pcv [kW/m³] at 100kHz, 200mT | | | | | | |
|---|---|---|---|---|---|---|---|---|---|---|---|---|---|---|
| | | | | | RT | 100°C | 25°C | 40°C | 60°C | 80°C | 90°C | 100°C | 120°C |
| 1 | 1300°C × 5 hrs, partial pressure of oxygen: 1.5% | 4.979 | 15.8 | 2612 | 546 | 454 | 638 | 533 | 417 | 320 | 299 | 348 | 473 |
| 2 | | 4.995 | 16.6 | 2633 | 553 | 460 | 644 | 526 | 412 | 315 | 305 | 351 | 503 |
| 3 | | 4.978 | 14.1 | 2441 | 545 | 452 | 656 | 547 | 439 | 350 | 308 | 322 | 446 |
| 4 | | 5.007 | 16.2 | 2614 | 550 | 455 | 613 | 507 | 398 | 309 | 295 | 334 | 473 |
| 5 | | 5.001 | 16.1 | 2644 | 545 | 455 | 600 | 514 | 403 | 318 | 295 | 332 | 463 |
| 6 | | 5.006 | 17.3 | 2610 | 547 | 460 | 607 | 506 | 402 | 312 | 306 | 335 | 467 |
| 7 | | 4.945 | 13.6 | 2481 | 541 | 445 | 666 | 566 | 460 | 360 | 334 | 336 | 444 |
| 8 | | 4.985 | 16.2 | 2478 | 537 | 451 | 645 | 544 | 429 | 345 | 304 | 310 | 414 |
| 9 | | 5.023 | 17.0 | 2586 | 554 | 457 | 593 | 494 | 400 | 314 | 296 | 320 | 444 |
| 10 | 1325°C × 5 hrs, partial pressure of oxygen: 2.0% | 4.986 | 15.4 | 2647 | 551 | 458 | 657 | 533 | 418 | 325 | 296 | 338 | 485 |
| 11 | | 5.005 | 16.2 | 2682 | 553 | 459 | 643 | 537 | 432 | 330 | 296 | 335 | 499 |
| 12 | | 5.010 | 21.2 | 2581 | 553 | 465 | 623 | 535 | 433 | 336 | 311 | 339 | 515 |
| 13 | | 4.997 | 18.8 | 2492 | 544 | 450 | 658 | 552 | 430 | 339 | 304 | 329 | 494 |
| 14 | | 5.004 | 21.0 | 2461 | 548 | 457 | 639 | 542 | 435 | 327 | 303 | 334 | 515 |
| 15 | | 5.010 | 16.2 | 2599 | 549 | 454 | 621 | 521 | 408 | 316 | 291 | 347 | 494 |
| 16 | | 4.999 | 24.2 | 2610 | 558 | 462 | 610 | 516 | 410 | 312 | 304 | 384 | 536 |
| 17 | | 4.970 | 16.1 | 2497 | 545 | 450 | 656 | 549 | 446 | 345 | 317 | 327 | 469 |
| 18 | | 4.977 | 17.9 | 2565 | 546 | 454 | 668 | 567 | 458 | 356 | 311 | 324 | 473 |
| 19 | | 4.993 | 14.0 | 2599 | 553 | 458 | 607 | 511 | 403 | 306 | 289 | 344 | 489 |

| Sample No. | Fe$_2$O$_3$ | MnO | ZnO | NiO | SiO$_2$ | CaCO$_3$ | Sintering conditions | $\mu i$ | Bs [mT] at 100°C | Pcv [kW/m$^3$] | B.Temp. [°C] |
|---|---|---|---|---|---|---|---|---|---|---|---|
| | [mol%] | | | | [ppm] | | | | | | |
| *20 | 53.5 | 36.0 | 10 | 0.5 | 100 | 1000 | 1325°C × 5 hrs, partial pressure of oxygen: 2.0% | 1703 | 432 | 321 | 130 |
| 21 | 54.5 | 35.0 | 9.0 | 1.5 | | | | 2276 | 450 | 291 | 100 |
| 22 | 56.0 | 35.3 | 6.0 | 2.7 | | | | 2153 | 463 | 333 | 100 |
| *23 | 57.5 | 33.5 | 5.0 | 4 | | | | 2808 | 465 | 387 | 60 |
| *24 | 55.7 | 38.0 | 4.5 | 1.8 | | | | 2356 | 464 | 375 | 90 |
| 25 | 55.4 | 36.8 | 6.0 | 1.8 | | | | 2198 | 464 | 336 | 100 |
| 26 | 54.8 | 34.4 | 9.0 | 1.8 | | | | 2224 | 449 | 306 | 100 |
| *27 | 54.4 | 32.8 | 11 | 1.8 | | | | 2208 | 437 | 313 | 100 |
| 28 | 54.6 | 37.5 | 7.4 | 0.5 | | | | 2352 | 450 | 300 | 100 |
| 29 | 55.0 | 36.2 | 6.8 | 2 | | | | 2409 | 459 | 298 | 100 |
| 30 | 55.5 | 35.1 | 6.4 | 3 | | | | 2156 | 466 | 339 | 110 |
| *31 | 56.1 | 33.4 | 6.0 | 4.5 | | | | 1884 | 465 | 404 | 110 |

Note: The samples having compositions other than the recommended ones are marked with "*".

FIG. 16

| Sample No. | Additive | [ppm] | Sintering conditions | $\mu i$ | Bs [mT] at 100°C | Pcv [kW/m³] | B.Temp. [°C] |
|---|---|---|---|---|---|---|---|
| 32 | Nb$_2$O$_5$ | 300 | 1325°C × 5 hrs, partial pressure of oxygen: 2.0% | 2224 | 462 | 308 | 100 |
| 33 | | 1000 | | 1610 | 451 | 431 | 100 |
| 34 | ZrO$_2$ | 300 | | 2390 | 460 | 302 | 100 |
| 35 | | 1500 | | 2219 | 446 | 449 | 100 |
| 36 | Ta$_2$O$_5$ | 300 | | 2393 | 462 | 310 | 100 |
| 37 | | 1500 | | 2070 | 445 | 428 | 100 |
| 38 | V$_2$O$_5$ | 300 | | 2267 | 464 | 306 | 100 |
| 39 | | 1500 | | 1876 | 453 | 515 | 90 |
| 40 | HfO$_2$ | 300 | | 2279 | 460 | 310 | 100 |
| 41 | | 1500 | | 1671 | 438 | 624 | 100 |
| 42 | In$_2$O$_5$ | 1000 | | 2348 | 463 | 307 | 100 |
| 43 | | 2500 | | 1988 | 448 | 398 | 100 |
| 44 | MoO$_3$ | 300 | | 2251 | 459 | 312 | 100 |
| 45 | | 1500 | | 1750 | 451 | 518 | 90 |
| 46 | Bi$_2$O$_3$ | 300 | | 2278 | 460 | 310 | 100 |
| 47 | | 1500 | | 1369 | 456 | 723 | 90 |
| 48 | SnO$_2$ | 5000 | | 2380 | 456 | 315 | 90 |
| 49 | | 15000 | | 2865 | 436 | 605 | 50 |
| 50 | TiO$_2$ | 5000 | | 2298 | 454 | 313 | 90 |
| 51 | | 15000 | | 3232 | 432 | 668 | 40 |

Note: 250 ppm of Nb$_2$O$_5$ was further added to Samples Nos. 34 to 51.

FIG. 17

| Sample No. | CoO [ppm] | Sintering conditions | μi | Bs [mT] at 100°C | B.Temp. [°C] | Pcv [kW/m³] | | |
|---|---|---|---|---|---|---|---|---|
| | | | | | | Pcv at RT | Pcv at 100°C | ΔPcv |
| 52 | 0 | 1325°C × 5 hrs, partial pressure of oxygen: 2.0% | 2265 | 461 | 100 | 781 | 302 | 479 |
| 53 | 1000 | | 2277 | 463 | 100 | 664 | 301 | 363 |
| 54 | 2000 | | 2210 | 459 | 100 | 621 | 314 | 307 |
| 55 | 3500 | | 2082 | 456 | 100 | 487 | 338 | 149 |
| 56 | 4500 | | 1847 | 452 | 100 | 697 | 411 | 286 |

Note: 100 ppm of $SiO_2$, 100 ppm of $CaCO_3$, 300 ppm of $Nb_2O_5$ and 120 ppm of $ZrO_2$ were further added to Samples Nos. 52 to 56.

METHOD FOR PRODUCING MN-ZN FERRITE

BACKGROUND OF THE INVENTION

1. Field of the Invention

The present invention relates to a method for producing a Mn—Zn ferrite having a high saturation magnetic flux density at high temperatures (in the vicinity of 100° C.), a high permeability and a low loss.

2. Description of the Related Art

Downsizing and high powering of electronic devices have been promoted. Accordingly, high density integration and high speed processing of various components have progressed, and thus power supply lines are demanded to supply large electric current.

Additionally, even under high temperatures, demanded are power supply lines which can maintain the predetermined performances. This is because power supply lines are exposed to heat emitted from components (for example, CPU) as the case may be. Additionally, power supply lines are required to maintain predetermined performances under such conditions that the environmental temperature is high as in automobile electronic circuits.

Accordingly, transformers and reactors to be used in power supply lines are also required to be capable of being used with large current even under high temperatures.

As the materials to be used for these transformers and reactors, soft magnetic metal materials and ferrite materials can be cited. Additionally, ferrite materials are classified into Mn—Zn based ferrites and Ni based ferries.

Soft magnetic metal materials are higher in saturation magnetic flux density than ferrites, and hence cause no magnetic saturation even for larger currents flowing therethrough. However, there are problems in that soft magnetic metal materials are generally high in loss, high in price, high in specific gravity, and poor in rustproof property.

On the other hand, ferrites are excellent in cost performance, and have advantage such that loss is low in a frequency range between a few 10 kHz and a few 100 kHz. Additionally, Mn—Zn based ferrites are higher in saturation magnetic flux density than Ni based ferrites. Therefore, for transformers and choke coils used for large current, Mn—Zn based ferrites are generally used.

For example, Japanese Patent Publication No. S63-59241, corresponding to JP 56-005331, has achieved a low loss at 150.degree. C. or higher by including at least one of NiO, Li.sub.2O and MgO in addition to MnO and ZnO. However, this ferrite is not suitable because the temperature at which the loss exhibits the minimum value (hereinafter referred to as bottom temperature) is 150.degree. C. or higher for this material, and accordingly this material causes degradation in loss and initial permeability in a temperature range (between 80 and 120.degree. C.) in which common transformers and cores for use in common reactors are used.

Additionally, Japanese Patent No. 3389170 discloses that substituting a part of a Mn—Zn ferrite with NiO makes the Mn—Zn ferrite excellent in DC pre-magnetization characteristics at a saturation magnetic flux density Bs of 440 mT or more and usable in a wide temperature range.

Moreover, in Japanese Patent Laid-Open No. 2001-080952, by adding CoO to a Mn—Zn ferrite, there have been achieved a drastic decrease in power loss in a wide temperature range of 20 to 100° C. and an alleviation of the temperature variation of the power loss; more specifically, there have been obtained properties such that the minimum power loss is 400 kW/m$^3$ or less and the difference between the maximum and the minimum of the power loss is 150 kW/m$^3$ or less.

Yet additionally, Japanese Patent Laid-Open 11-3813 has shown that decrease of loss can be achieved even in a high frequency range of approximately 1 MHz or more by including NiO and CoO as basic constituents in a Mn—Zn ferrite having a content of $Fe_2O_3$ exceeding 50 mol %. This Mn—Zn ferrite has a composition in which 52 to 68 mol % of $Fe_2O_3$, 0.5 to 10 mol % of NiO, 15 mol % or less of ZnO, 0.005 to 0.5 mol % of CoO, and the balance substantially being MnO.

Additionally, a ferrite disclosed in Japanese Patent Laid-Open No. 2000-286119 is known as a Mn—Zn ferrite simultaneously containing NiO and CoO. This ferrite has a basic composition including 52 to 56 mol % of $Fe_2O_3$, 6 to 14 mol % of ZnO, 4 mol % or less of NiO, 0.01 to 0.6 mol % of CoO, and the balance substantially being MnO, wherein this ferrite further comprises 0.0050 to 0.0500 wt % of $SiO_2$ and 0.0200 to 0.2000 wt % of CaO in relation to the basic composition, and at least one additive, in a predetermined content, selected from the group consisting of $Ta_2O_5$, $ZrO_2$, $Nb_2O_5$, $V_2O_5$, $K_2O$, $TiO_2$, $SnO_2$ and $HfO_2$, and the temperature at which the loss of the ferrite becomes minimum is 50° C. or higher and 85° C. or lower under the measurement conditions of 100 kHz in frequency and 200 mT in maximum magnetic flux density.

As described above, a Mn—Zn ferrite including both of NiO and CoO can be provided with an excellent property of loss. In this connection, although the Mn—Zn ferrite disclosed in Japanese Patent Laid-Open No. 11-3813 is excellent for the loss in a high frequency range of approximately 1 MHz or more, this ferrite is not suitable for use in a frequency range between a few 10 kHz and a few 100 kHz.

Additionally, when even if the saturation magnetic flux density at room temperature is high, the saturation magnetic flux density is decreased in the temperature range (between 80 and 120° C.) in which common transformers and cores for use in reactors are used, the desired performances of the transformers and the cores for use in reactors cannot be displayed.

In the Mn—Zn ferrite disclosed in Japanese Patent Laid-Open 2000-286119, the loss in the frequency range between a few 10 kHz and a few 100 kHz is excellent, but any significant consideration has not been made on the saturation magnetic flux density in the vicinity of 100° C.

SUMMARY OF THE INVENTION

The present invention has been achieved on the basis of such technical problems, and takes as its object to provide a Mn—Zn ferrite which is low in the loss in the frequency range between a few 10 kHz and a few 100 kHz, and high in the saturation magnetic flux density in the vicinity of 100° C.

For the purpose of achieving such an object, the present inventors have made an elaborate investigation, and consequently have found that the properties of the particles (the primary particles) of the raw material powder used for producing MnZn ferrites vary the temperature at which the loss exhibits the minimum value (hereinafter referred to as bottom temperature) and vary the saturation magnetic flux density in the vicinity of 100° C. The present invention is based on this finding, to be a method for producing a Mn—Zn ferrite comprising the steps of compacting a powder having a specific surface area (based on the BET method) of 2.0 to 5.0 m$^2$/g and a 50% particle size of 0.7 to 2.0 μm into a compacted body having a predetermined shape, and obtaining a sintered body by sintering the compacted body. A powder to be compacted is usually obtained by calcining a raw material powder, and then milling the thus calcined substance; however, a powder to be compacted may comprise additives. Here, it is to be noted that the 50% particle size is a particle size at which a cumulative curve indicates 50% when the cumulative curve is obtained by taking as 100% the total volume of the measured particles.

The Mn—Zn ferrite in the present invention preferably comprises as main constituents 54 to 57 mol % of $Fe_2O_3$, 5 to 10 mol % of ZnO, 4 mol % or less (not inclusive of 0%) of NiO, and the balance substantially being MnO.

Additionally, in the present invention, a powder to be compacted preferably has a 90% particle size of 4.0 μm or less. Here, it is to be noted that the 90% particle size is a particle size at which a cumulative curve indicates 90% when the cumulative curve is obtained by taking as 100% the total volume of the measured particles.

Moreover, in the present invention, the sintering of a compacted body is preferably carried out at a retention temperature of 1250 to 1450° C.

In the present invention, as first additives, 60 to 250 ppm of Si in terms of $SiO_2$ and 700 to 2500 ppm of Ca in terms of $CaCO_3$ are preferably contained. Additionally, as second additives, one or more selected from the group consisting of CoO: 500 to 4000 ppm, $Nb_2O_5$: 50 to 500 ppm, $ZrO_2$: 50 to 1000 ppm, $Ta_2O_5$: 50 to 1000 ppm, $V_2O_5$: 50 to 1000 ppm, $HfO_2$: 50 to 1000 ppm, $In_2O_3$: 50 to 2000 ppm, $MoO_3$: 50 to 1000 ppm, $Bi_2O_3$: 50 to 1000 ppm are preferably contained. Moreover, as third additives, one or both of $SnO_2$: 500 to 10000 ppm and $TiO_2$: 500 to 10000 ppm are preferably contained.

According to the above described producing method for the present invention, there can be obtained a MnZn ferrite which is formed of a sintered body having a mean grain size of 5 to 35 μm, and in which the saturation magnetic flux density thereof at 100° C. is 440 mT or more, the bottom temperature thereof at which the loss exhibits the minimum value is 85 to 120° C., and the minimum loss value (100 kHz, 200 mT) thereof is 350 kW/m$^3$ or less.

According to the present invention, there can be provided a Mn—Zn ferrite which is low in the loss in the frequency range between a few 10 kHz and a few 100 kHz, and high in the saturation magnetic flux density in the vicinity of 100° C.

DETAILED DESCRIPTION OF THE PREFERRED EMBODIMENTS

The present invention will be described below in detail.

At the beginning, the reason for limiting the composition will be described.

Increase of the content of $Fe_2O_3$ improves the saturation magnetic flux density in the high temperature region, but on the other hand, makes the loss tend to be degraded. If the content of $Fe_2O_3$ is less than 54 mol %, the saturation magnetic flux density in the high temperature region decreases, while if the content of $Fe_2O_3$ exceeds 57 mol %, the increase of the loss becomes remarkable. Accordingly, in the present invention, the content of $Fe_2O_3$ is set between 54 and 57 mol %. In this range, as the content of $Fe_2O_3$ is increased, the bottom temperature shifts to the lower temperature side; however, when the content of $Fe_2O_3$ falls within the range between 54 and 57 mol %, the bottom temperature can be set within a range between 85 and 120° C. while the magnetic properties are being maintained or the degradation of the magnetic properties is being suppressed to be as small as possible. The content of $Fe_2O_3$ is preferably 54.5 to 56.5 mol %, and more preferably 54.5 to 55.5 mol %.

<ZnO>

The content of ZnO also affects the saturation magnetic flux density and the loss. When the content of ZnO is less than 5 mol %, the saturation magnetic flux density is decreased and the loss is increased. Also, when the content of ZnO exceeds 10 mol %, the saturation magnetic flux density is decreased and the loss is increased. Accordingly, in the present invention, the content of ZnO is set between 5 and 10 mol %. As the content of ZnO is increased, the bottom temperature shifts to the lower temperature side;

however, when the content of ZnO falls within the range between 5 to 10 mol %, the bottom temperature can be set within a range between 85 and 120° C. while the magnetic properties are being maintained or the degradation of the magnetic properties is being suppressed to be as small as possible. The content of ZnO is preferably 6 to 9 mol %, and more preferably 7 to 8 mol %.

<NiO>

NiO increases the Curie temperature and can thereby improve the saturation magnetic flux density. However, when the content of NiO exceeds 4 mol %, the loss becomes large. Accordingly, in the present invention, for the purpose of enjoying the effects such that the saturation magnetic flux density is improved and the loss is low, NiO is made to be contained in a content of 4 mol % or less (not inclusive of 0). The content of NiO is preferably 0.2 to 4 mol %, and more preferably 0.5 to 3 mol %.

The ferrite material of the present invention can contain Si within a range between 60 and 250 ppm in terms of $SiO_2$ and Ca within a range between 700 and 2500 ppm in terms of $CaCO_3$. Si and Ca segregate on the grain boundary to form high-resistance layers and thereby contribute to decreasing the loss. In addition, Si and Ca have as sintering aids an effect for improving the density of sintered body. If the content of Si exceeds 250 ppm in terms of $SiO_2$ or the content of Ca exceeds 2500 ppm in terms of $CaCO_3$, discontinuous abnormal grain growth occurs, and degradation of the loss is large. Accordingly, in the present invention, the content of Si is set to be 250 ppm or less in terms of $SiO_2$, and the content of Ca is set to be 2500 ppm or less in terms of $CaCO_3$. On the other hand, if the content of Si is less than 60 ppm in terms of $SiO_2$ or the content of Ca is less than 700 ppm in terms of $CaCO_3$, the above described effect cannot be fully obtained, so that it is preferable that Si is contained in a content of 60 ppm or more in terms of $SiO_2$ and Ca is contained in a content of 700 ppm or more in terms of $CaCO_3$. The contents of Si and Ca are preferably set between 80 and 200 ppm in terms of $SiO_2$ and between 1000 and 1800 ppm in terms of $CaCO_3$, respectively, and more preferably, between 80 and 150 ppm in terms of $SiO_2$ and between 1200 and 1700 ppm in terms of $CaCO_3$, respectively.

Additionally, when Si and Ca are added in combination, it is effective that the weight ratio (content of $SiO_2$/content of $CaCO_3$) between the content of $SiO_2$ and the content of $CaCO_3$ is set to fall within a range between 0.04 and 0.25, and more preferably between 0.05 and 0.2.

The present invention can contain as second additives one or both of CoO: 500 to 4000 ppm, $Nb_2O_5$: 50 to 500 ppm, $ZrO_2$: 50 to 1000 ppm, $Ta_2O_5$: 50 to 1000 ppm, $V_2O_5$: 50 to 1000 ppm, $HfO_2$: 50 to 1000 ppm, $In_2O_3$: 50 to 2000 ppm, $MoO_3$: 50 to 1000 ppm and $Bi_2O_3$: 50 to 1000 ppm. Inclusion of these second additives can yield an effect such that the saturation magnetic flux density is improved and/or the loss is reduced. In order to fully enjoy this effect, it is preferable to set the contents of CoO, $Nb_2O_5$ and $In_2O_3$ such that CoO: 600 to 2500 ppm, $Nb_2O_5$: 100 to 400 ppm and $In_2O_3$: 50 to 1000 ppm. The contents of $ZrO_2$, $Ta_2O_5$, $V_2O_5$, $HfO_2$, $MoO_3$ and $Bi_2O_3$ each are preferably 50 to 400 ppm. The more preferable contents are as follows: CoO: 600 to 2000 ppm, $Nb_2O_5$: 80 to 300 ppm and $In_2O_3$: 50 to 400 ppm. Additionally, when these second additives are added in combination, the sum of the addition contents is preferably set at 5000 ppm or less. Among the above-mentioned second additives, CoO is the most preferable.

The present invention can contain as third additives one or two of $SnO_2$: 500 to 10000 ppm and $TiO_2$: 500 to 10000 ppm. $SnO_2$ and $TiO_2$ are present inside the grains and in the grain boundaries, and have an effect of reducing loss. However, if the contents of $SnO_2$ and $TiO_2$ each exceed 10000 ppm, $SnO_2$ and $TiO_2$ cause degradation of loss and decrease of the saturation magnetic flux density, ascribable to the discontinuous abnormal grain growth. Accordingly, in the present invention, the upper limit of the content of $SnO_2$ and the upper limit of the content of $TiO_2$ are respectively set at 10000 ppm. On the other hand, in order to fully enjoy the above described effect of reducing loss, it is preferable that the third additives each are contained in a content of 500 ppm or more. The further preferable contents of the third additives are as follows: $SnO_2$: 1000 to 8000 ppm; and $TiO_2$: 1000 to 8000 ppm. The more preferable contents of the third additives are as follows: $SnO_2$: 1000 to 7000 ppm; and $TiO_2$: 1000 to 7000 ppm. Additionally, when these third additives are added in combination, the sum of the addition contents is preferably set at 10000 ppm or less.

Next, a preferred method for producing the Mn—Zn ferrite of the present invention will be described below.

As raw materials used as main constituents, there are used powders of oxides or powders of compounds to be converted into oxides by heating. More specifically, $Fe_2O_3$ powders, $Mn_3O_4$ powders, ZnO powders, NiO powders and the like can be used.

After the raw material powders of the main constituents have been subject to wet mixing, the mixture thus obtained is calcined. The calcining temperature may be selected to fall within a range between 700 and 1000° C. The calcining atmosphere may be nitrogen or air. The calcining time may be selected as appropriate in a range between 0.5 and 5.0 hours. After calcining, the calcined substance is milled. In addition, in the present invention, raw materials used as main constituents are not limited to those described above, but complex oxide powders containing two or more metal elements may be used as raw materials for main constituents. For example, an aqueous solution containing ferric chloride and Mn chloride is subjected to oxidizing roasting, so as to obtain a complex oxide powder containing Fe and Mn. This complex oxide powder may be mixed with a ZnO powder to prepare a main constituent raw material. In this case, calcining is unnecessary.

Similarly, as raw materials used as additives, there can be used powders of oxides or compounds to be converted to oxides by heating. Specifically, there can be used $SiO_2$, $CaCO_3$, $Co_3O_4$, $Nb_2O_5$, $ZrO_2$, $Ta_2O_5$, $HfO_2$, $In_2O_3$, $SnO_2$, $TiO_2$, $MoO_3$, $V_2O_5$, $Bi_2O_3$ and the like. Raw material powders used as these additives are mixed with powders of main constituents milled after calcining. Alternatively, after raw material powders used as additives and raw material powders used as main constituents have been mixed together, the mixed powder can be calcined.

For the mixed powder comprising of main constituents and additives, the specific surface area (based on the BET method, and the same in what follows) thereof is set between 2.0 and 5.0 $m^2/g$ and the 50% particle size thereof is set between 0.7 and 2.0 μm. In this connection, when the specific surface area is less than 2.0 $m^2/g$ or exceeds 5.0 $m^2/g$, the loss becomes large. Additionally, when the specific surface area is less than 2.0 $m^2/g$, the saturation magnetic flux density becomes small. On the other hand, when the 50% particle size is less than 0.7 μm or exceeds 2.0 μm, the loss becomes large. Additionally, when the 50% particle size exceeds 2.0 μm, the saturation magnetic flux density becomes small. The specific surface area is preferably 2.5 to 4.0 m²/g and the 50% particle size is preferably 0.9 to 1.5 μm.

For the purpose of providing the mixed powder to be compacted with such properties, there can be applied methods well known in the art including regulation of the conditions for milling to be conducted after calcining, or classifying.

After the calcined substance is milled, the milled powder is granulated to smoothly carry out the following compacting step. Granulation can be carried out by use of, for example, a spray dryer. A suitable binder such as polyvinyl alcohol (PVA) is added in a small amount to the mixed powder, and the mixture is then sprayed and dried with a spray dryer. The granules thus obtained are preferably approximately between 80 and 200 μm in mean particle size.

The obtained granules are compacted into a desired form, using a press equipped with a die with a certain shape. The obtained compacted body is then sintered in the following sintering step.

In the sintering step, it is necessary that the sintering temperature and the sintering atmosphere are controlled.

The sintering temperature can be selected as appropriate in a range between 1250 and 1450° C. However, in order to fully bring forth the effect of the Mn—Zn ferrite of the present invention, the compacted body is preferably sintered in a range between 1300 and 1400° C.

The mean grain size of the Mn—Zn ferrite according to the present invention is preferably set in a range between 5 and 35 μm. This is because if the mean grain size is less than 5 μm, the hysteresis loss becomes large, while if the mean grain size is so large as to exceed 35 μm, the eddy current loss becomes large. The preferable mean grain size is 8 to 30 μm, more preferably 10 to 25 μm.

As in the present invention, by specifying the powder to be compacted, prior to sintering as described above, there can be obtained a Mn—Zn ferrite having properties such that the saturation magnetic flux density thereof at 100° C. is 440 mT or more, the bottom temperature at which the loss exhibits the minimum value is 85 to 120° C., and the minimum loss value (measurement conditions: 100 kHz, 200 mT) is 350 kW/m³ or less.

EXAMPLE 1

As the main constituent raw materials, Fe₂O₃ powder, MnO powder, ZnO powder and NiO powder were used. These powders were subjected to wet mixing so as to have a composition shown in FIG. 1, and then the mixtures were calcined at temperatures shown in FIG. 1.

Then, the calcined substances of the main constituent raw materials and the raw materials for additives were mixed together. As the raw materials for additives, there were used SiO₂ powder, CaCO₃ powder, Nb₂O₅ powder, ZrO₂ powder and Co₃O₄ powder. The raw materials for additives were added to the calcined substances of the main constituent raw materials, and were mixed while conducting milling. It is to be noted that the specific surface areas (BET), the 50% particle sizes and the 90% particle sizes of the mixed powers after milling were measured and the results thus obtained are shown in FIG. 1.

Figure 1:
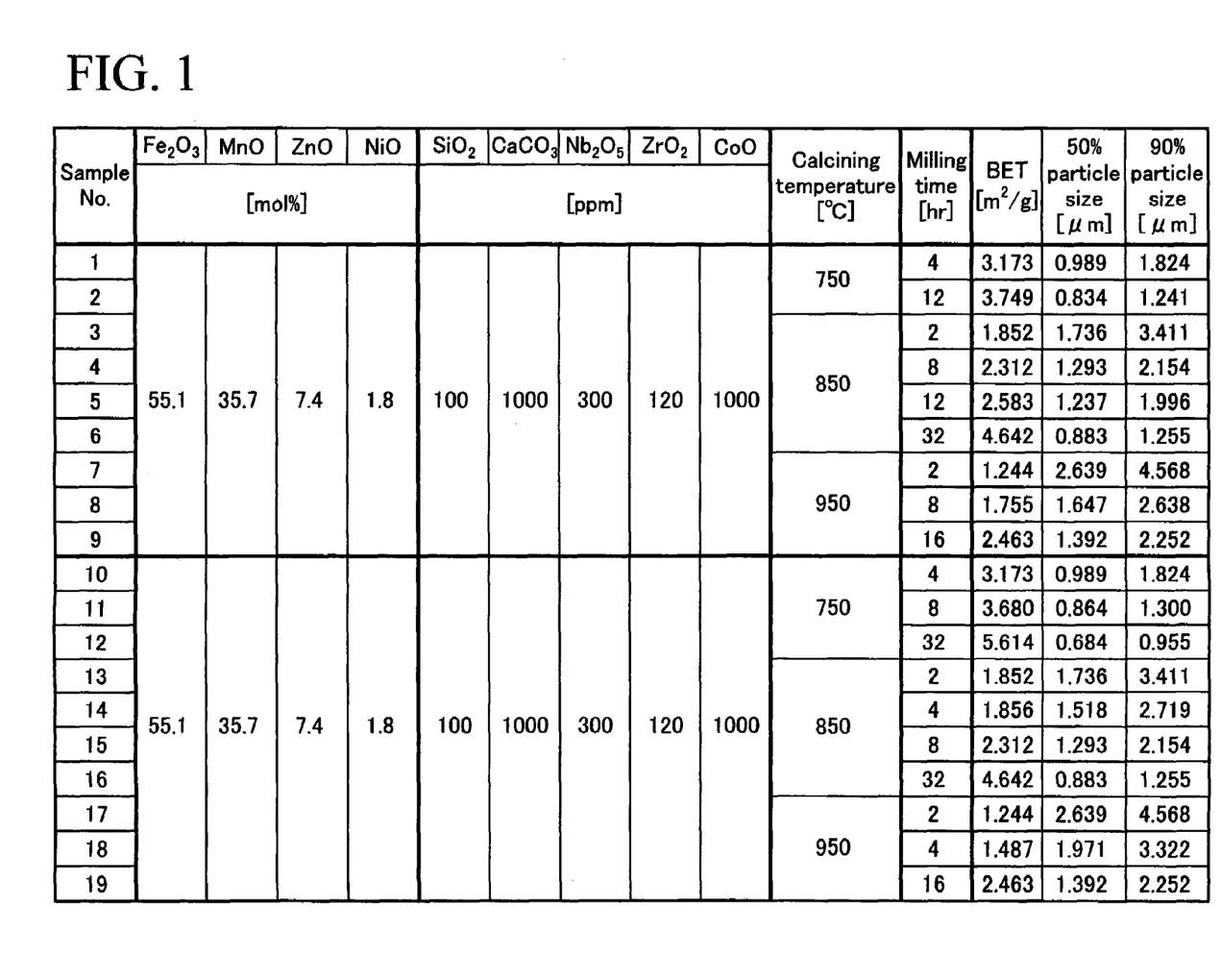
FIG. 1 is a table showing the compositions and the like of the samples prepared in Example 1.

From FIG. 1, it has been verified that the lower is the calcining temperature and the longer is the milling time, the larger is the specific surface area (BET) of the powder.

Next, a binder was added to each of the obtained mixtures, and the mixtures were granulated, and compacted so as to obtain toroidal compacted bodies.

Figure 2:
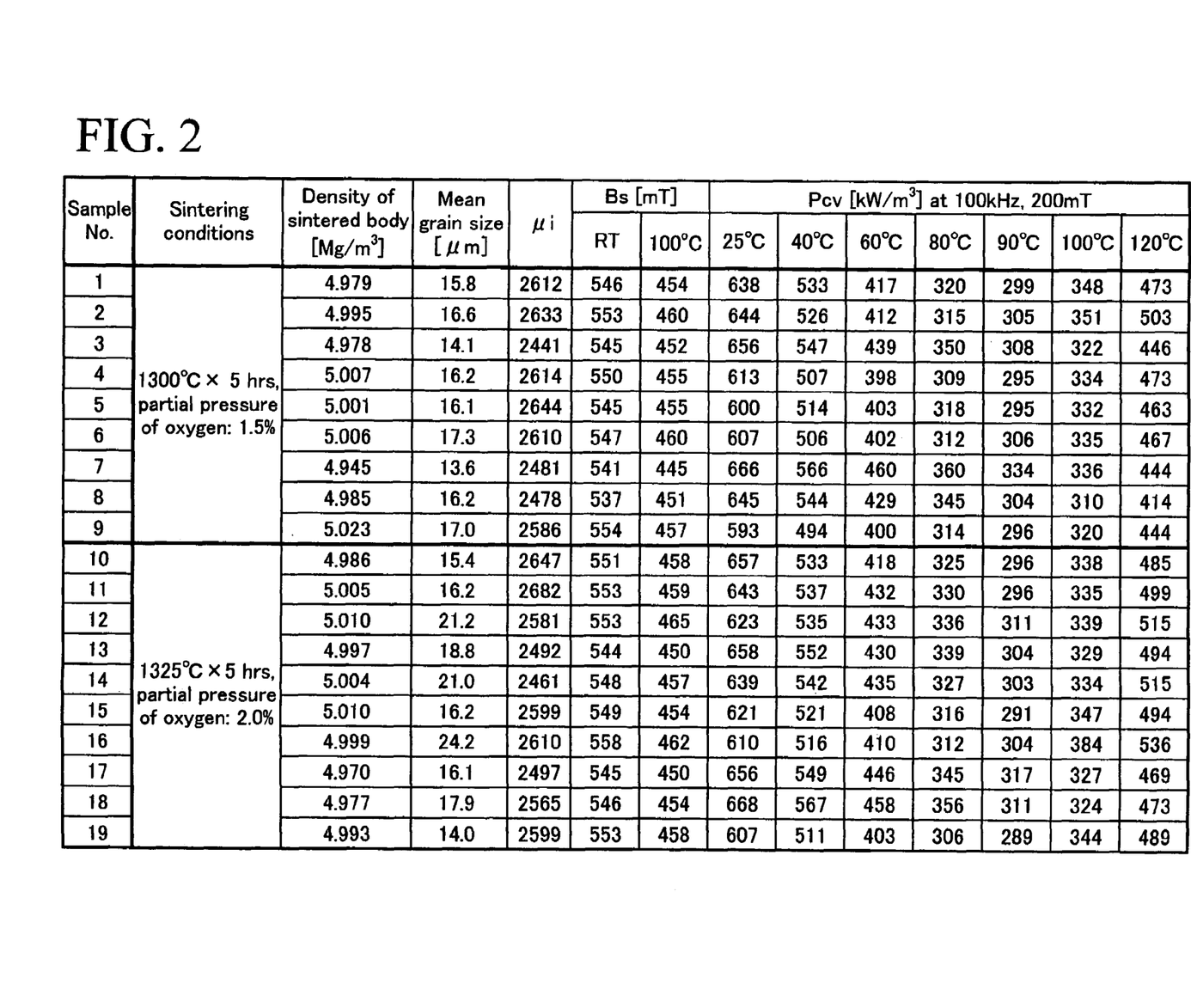
FIG. 2 is a table showing the magnetic properties and the like of the samples prepared in Example 1.
Figure 3:
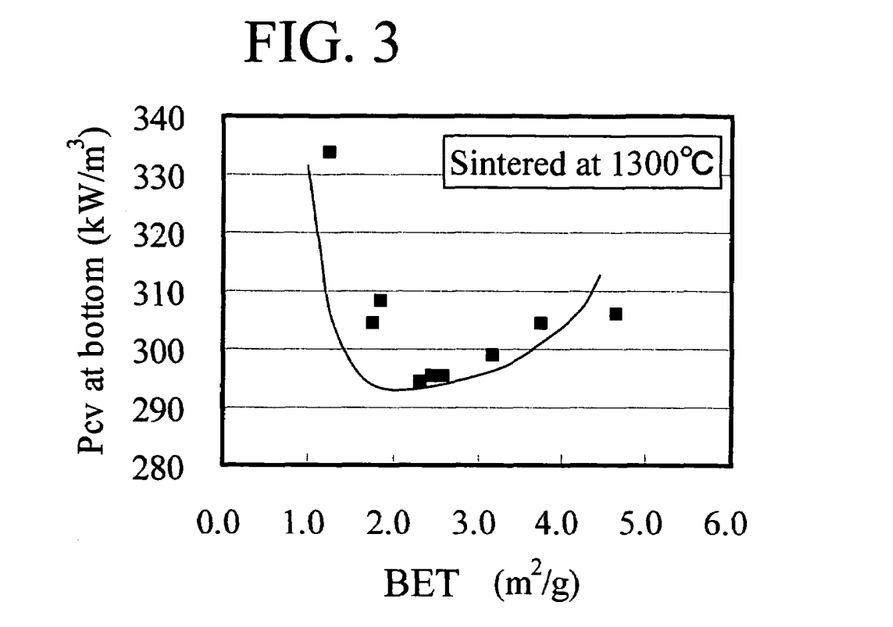
FIG. 3 is a graph showing the relation between the specific surface area at a sintering temperature of 1300° C. and the loss at the bottom temperature.
Figure 4:
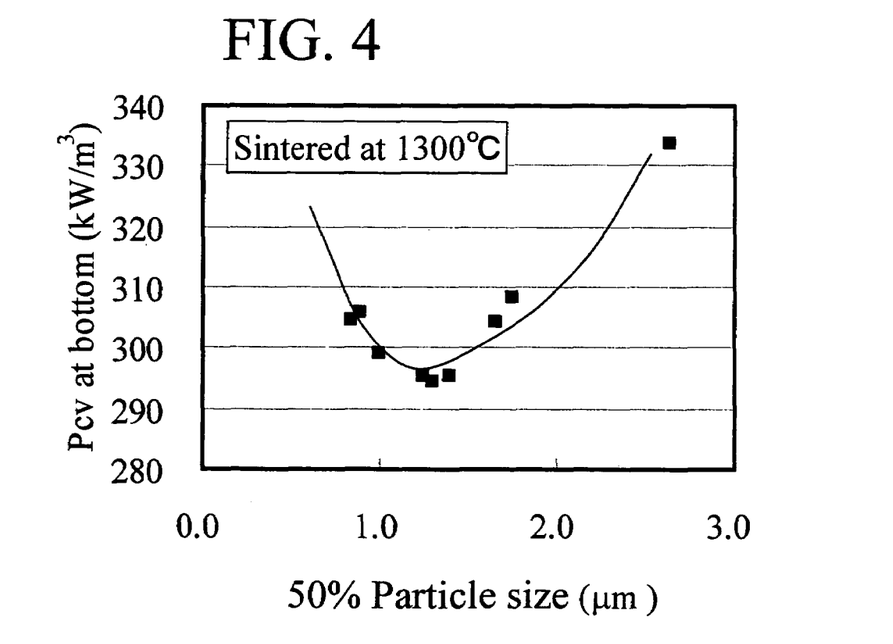
FIG. 4 is a graph showing the relation between the 50% particle size at a sintering temperature of 1300° C. and the loss at the bottom temperature.
Figure 5:
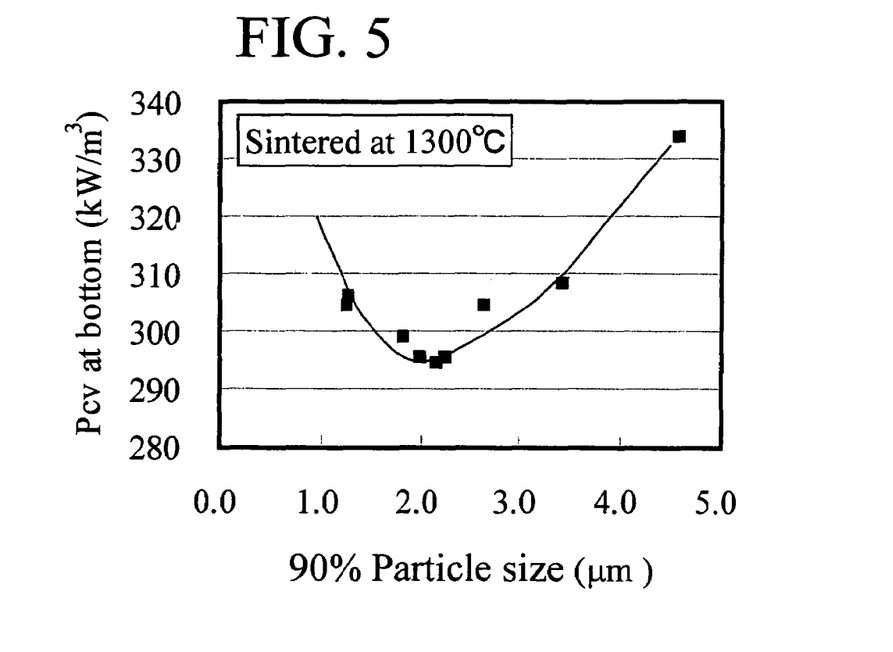
FIG. 5 is a graph showing the relation between the 90% particle size at a sintering temperature of 1300° C. and the loss at the bottom temperature.
Figure 6:
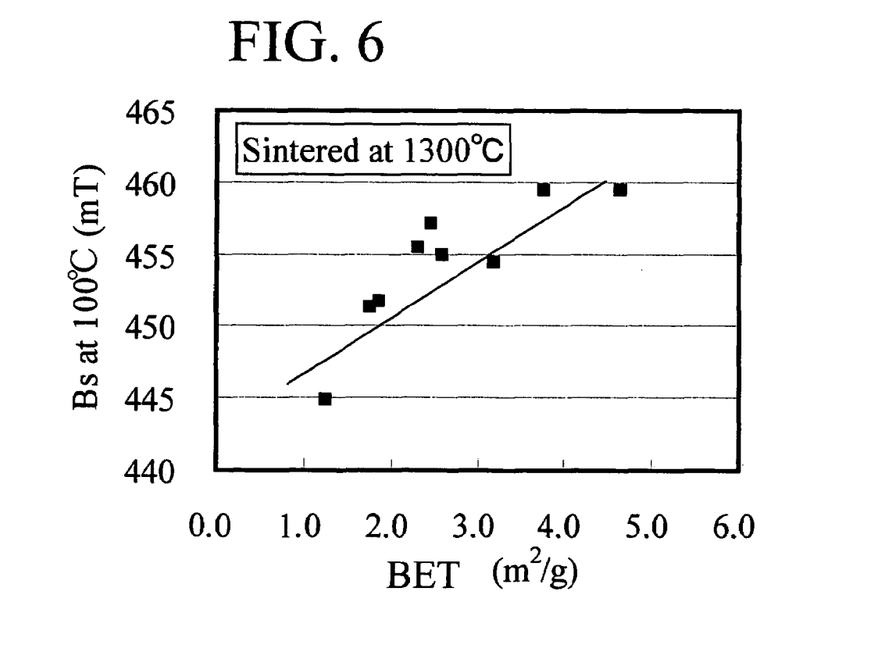
FIG. 6 is a graph showing the relation between the specific surface area at a sintering temperature of 1300° C. and the saturation magnetic flux density.
Figure 7:
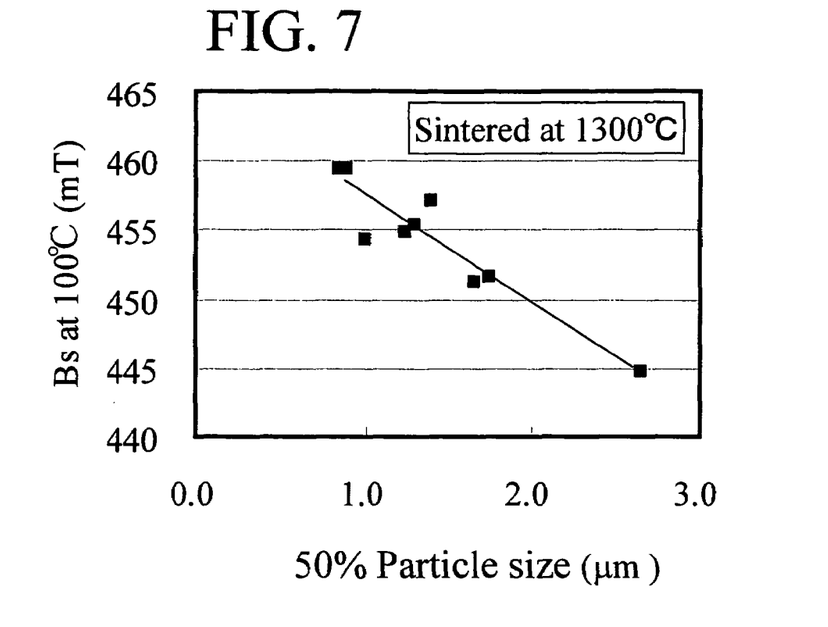
FIG. 7 is a graph showing the relation between the 50% particle size at a sintering temperature of 1300° C. and the saturation magnetic flux density.
Figure 8:
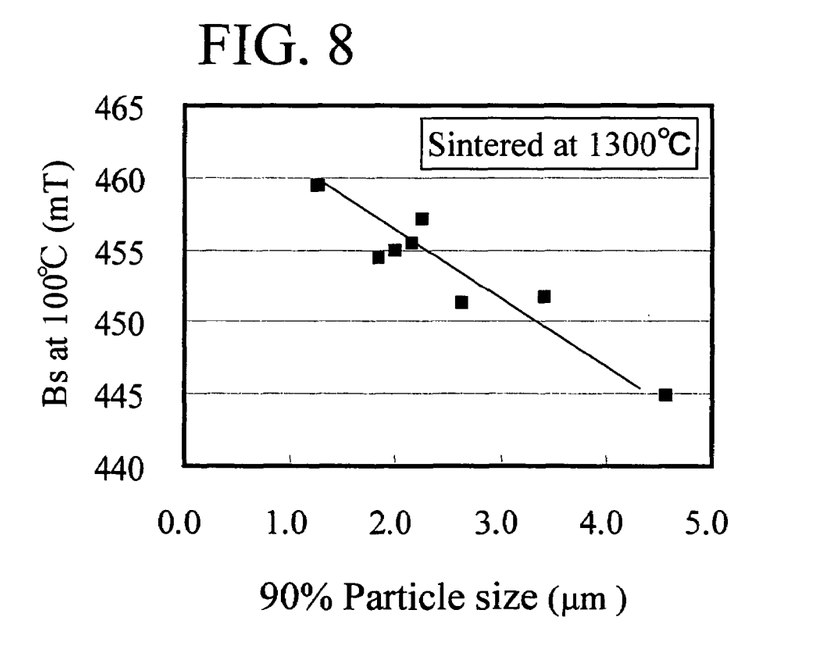
FIG. 8 is a graph showing the relation between the 90% particle size at a sintering temperature of 1300° C. and the saturation magnetic flux density.
Figure 9:
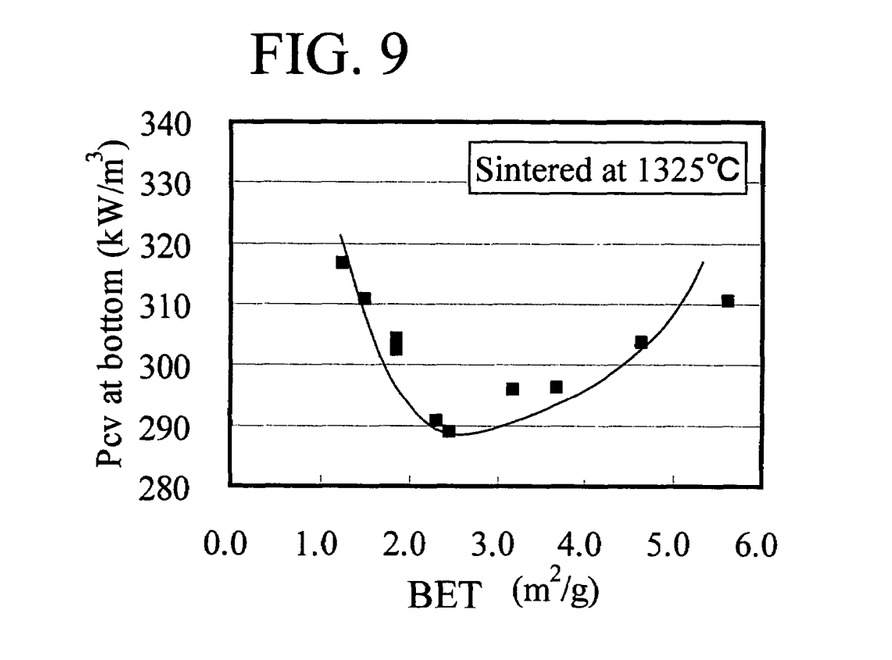
FIG. 9 is a graph showing the relation between the specific surface area at a sintering temperature of 1325° C. and the loss at the bottom temperature.
Figure 10:
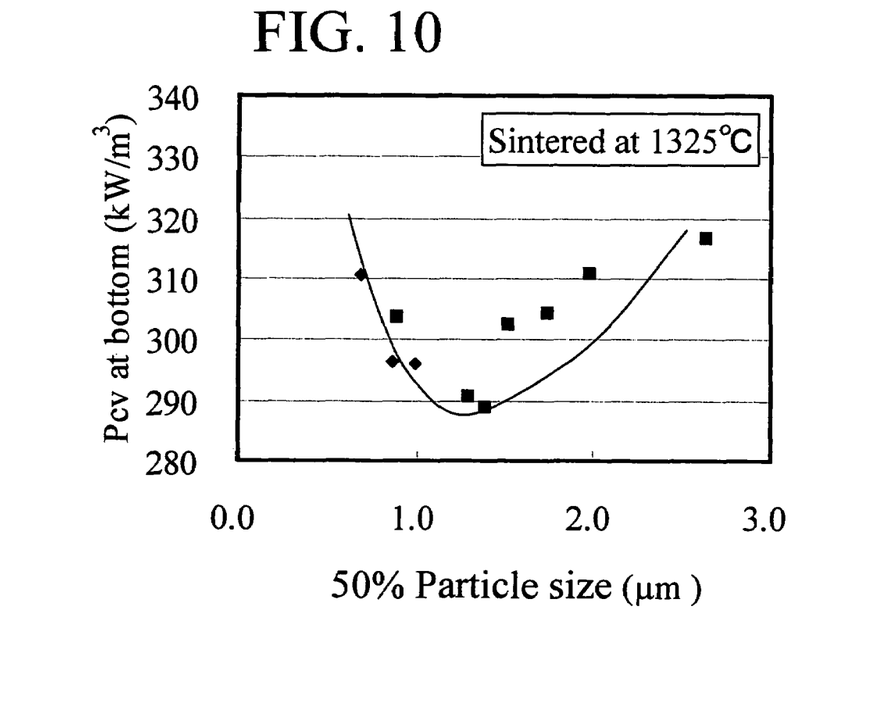
FIG. 10 is a graph showing the relation between the 50% particle size at a sintering temperature of 1325° C. and the loss at the bottom temperature.
Figure 11:
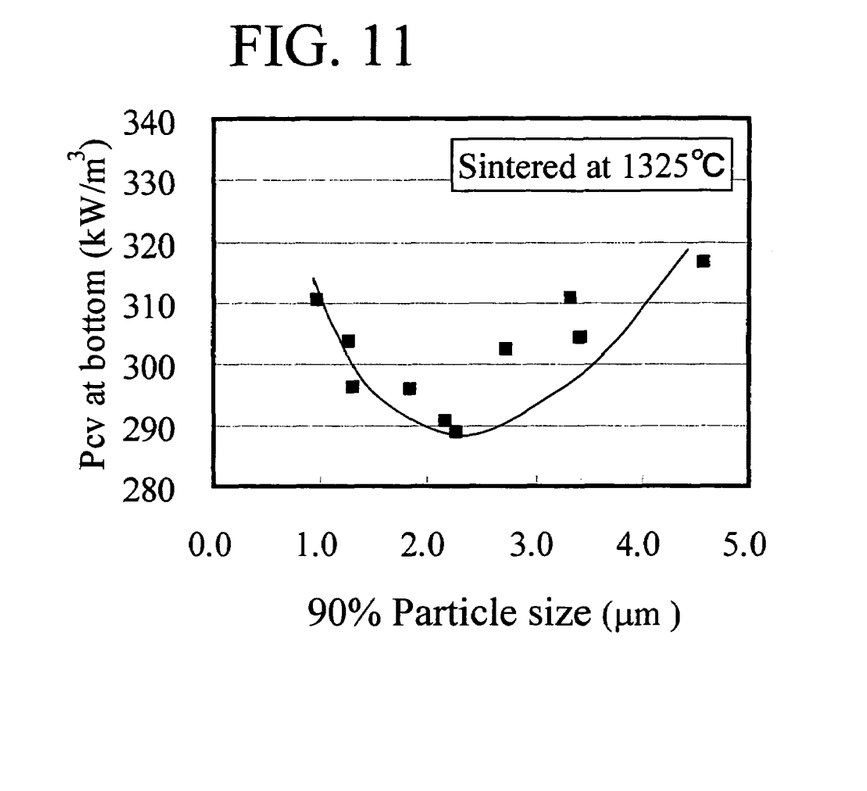
FIG. 11 is a graph showing the relation between the 90% particle size at a sintering temperature of 1325° C. and the loss at the bottom temperature.
Figure 12:
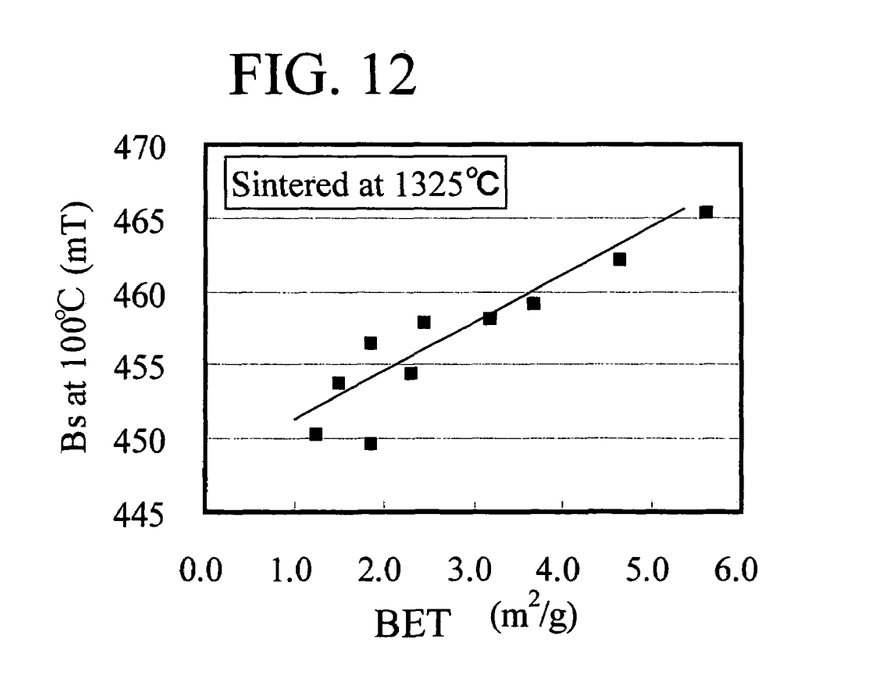
FIG. 12 is a graph showing the relation between the specific surface area at a sintering temperature of 1325° C. and the saturation magnetic flux density.
Figure 13:
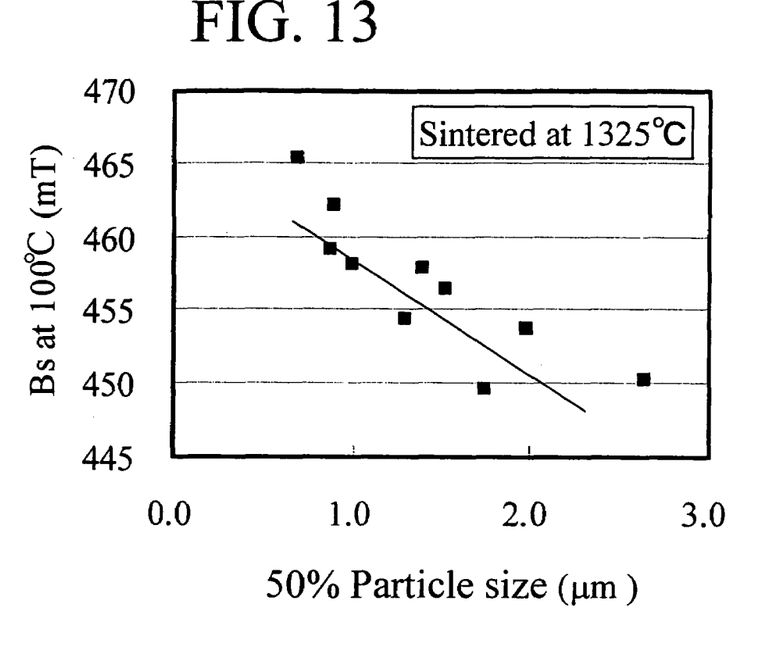
FIG. 13 is a graph showing the relation between the 50% particle size at a sintering temperature of 1325° C. and the saturation magnetic flux density.
Figure 14:
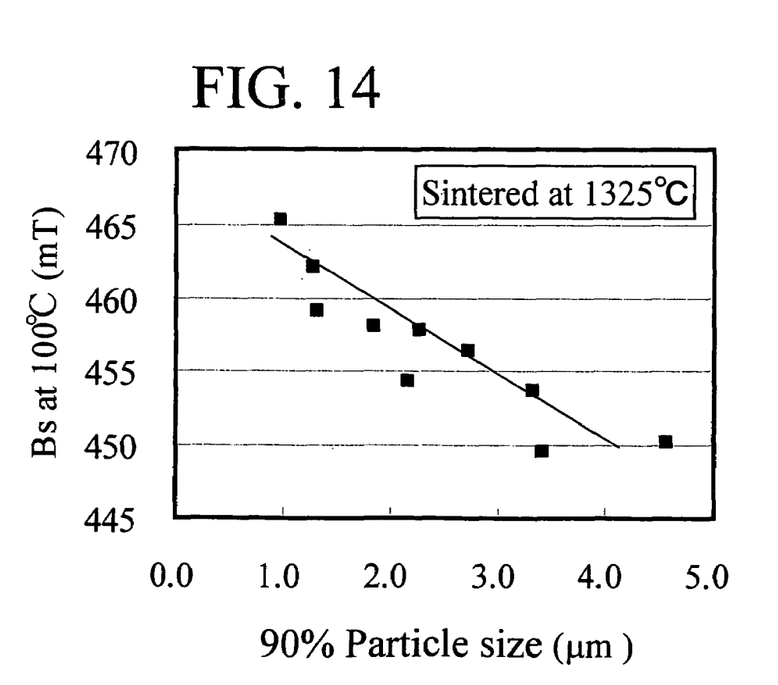
FIG. 14 is a graph showing the relation between the 90% particle size at a sintering temperature of 1325° C. and the saturation magnetic flux density.

The obtained compacted bodies were sintered under the conditions shown in FIG. 2, so as to obtain ferrite cores.

By use of these ferrite cores, the initial permeabilities (μi, measurement temperature: 25° C., measurement frequency: 100 kHz), the saturation magnetic flux densities (Bs, magnetic field for measurement: 1194 A/m) at 25° C. (RT) and 100° C., the core loss values (Pcv, measurement conditions: 100 kHz, 200 mT) at 25 to 120° C. were measured. The results obtained are shown in FIG. 2.

FIGS. 3 to 14 show the loss values at the bottom temperature (90° C.) (Pcv at bottom) as a function of the specific surface area (BET), the 50% particle size, or the 90% particle size, and show the saturation magnetic flux densities at 100° C. (Bs at 100° C.) as a function of the specific surface area (BET), the 50% particle size, or the 90% particle size. It is to be noted that FIGS. 3 to 8 show the results for the samples sintered at 1300° C., while FIGS. 9 to 14 show the results for the samples sintered at 1325° C.

As can be seen from FIGS. 3 to 5 and FIGS. 9 to 11, the loss at the bottom temperature varies as a function of the specific surface area (BET), the 50% particle size or the 90% particle size, and the loss becomes large either for the too small values or the too large values of the specific surface area (BET), the 50% particle size and the 90% particle size. In other words, for the purpose of decreasing the loss at the bottom temperature, it is necessary to control the specific surface area (BET), the 50% particle size and the 90% particle size.

On the other hand, as shown in FIGS. 6 to 8 and FIGS. 12 to 14, the larger is the specific surface area (BET), contrarily, the smaller are the 50% and 90% particle sizes, the higher values the saturation magnetic flux density at 100° C. can acquire.

Accordingly, for the purpose of making desirable both of the loss at the bottom temperature and the saturation magnetic flux density at 100° C., it is preferable that the specific surface area (BET) falls within the range between 2.0 and 5.0 m²/g, the 50% particle size falls within the range between 0.7 and 2.0 μm, and the 90% particle size falls within the range of 4.0 μm or less.

EXAMPLE 2

Figure 15:
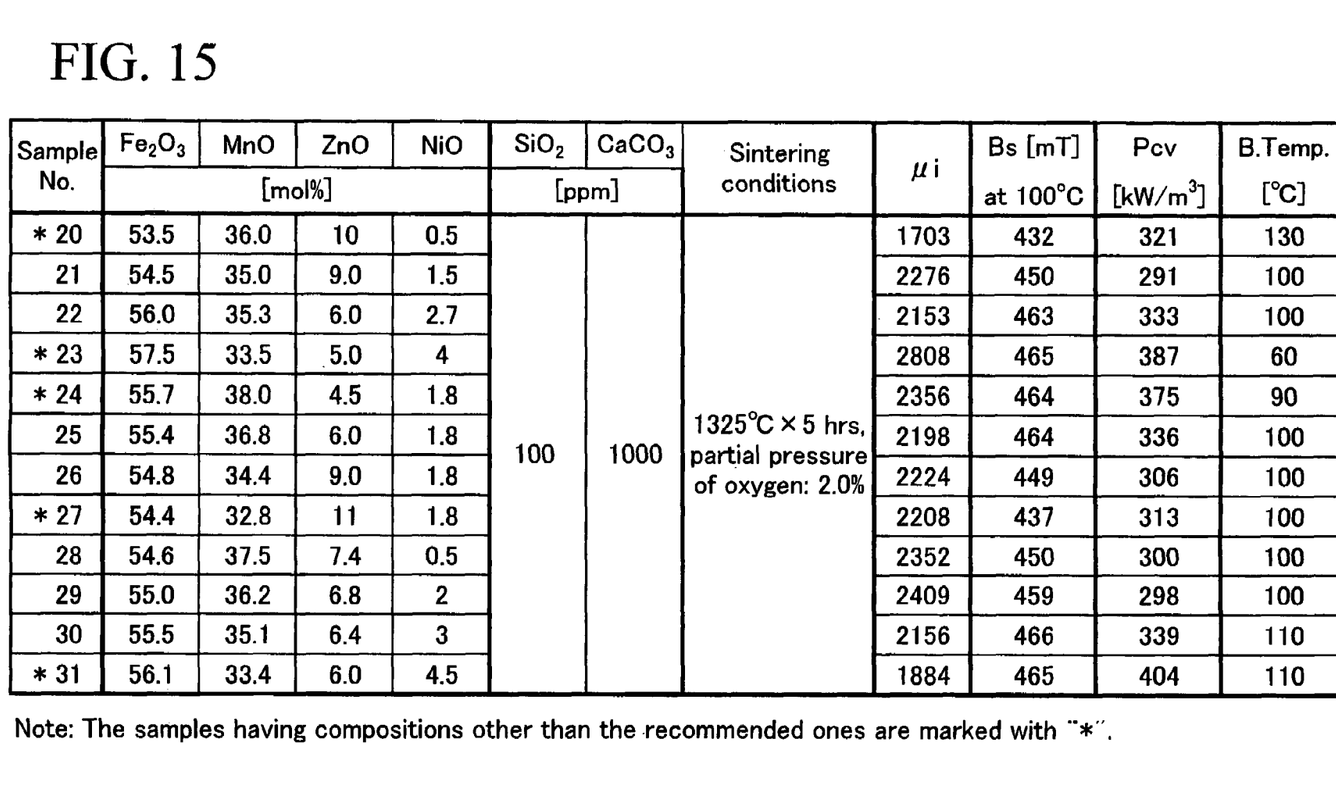
FIG. 15 is a table showing the compositions, magnetic properties and the like of the samples prepared in Example 2.

The Mn—Zn ferrites were prepared in the same way as in Example 1 except that the compositions and the sintering conditions were set as shown in FIG. 15, and only SiO₂ and CaCO₃ were further added as first additives. The properties of the ferrites were measured in the same manner as in Example 1. The results obtained are also shown in FIG. 15. Here, it is to be noted that the properties of the powders prior to sintering are as follows, and in FIG. 15, Pcv denotes the loss at the bottom temperature and B. Temp. denotes the bottom temperature.

BET: 2.5 to 4.0 m²/g
50% particle size: 0.7 to 1.5 μm
90% particle size: 1.0 to 4.0 μm As shown in FIG. 15, when the content of Fe₂O₃ is such small as 53.5 mol %, the saturation magnetic flux density (Bs) becomes small. On the other hand, when the content of Fe₂O₃ is such large as 57.5 mol %, the loss becomes large.

Next, when the content of ZnO is such small as 4.5 mol %, the loss becomes large. On the other hand, when the content of ZnO is such large as 11 mol %, the saturation magnetic flux density (Bs) becomes small.

Additionally, when the content of NiO is such large as 4.5 mol %, the loss becomes large.

From the above described results, in the present invention, the main constituents are preferably 54 to 57 mol % of $Fe_2O_3$, 5 to 10 mol % of ZnO, 4.0 mol % or less (not inclusive of 0) of NiO, and the balance substantially being MnO.

EXAMPLE 3

Figure 16:
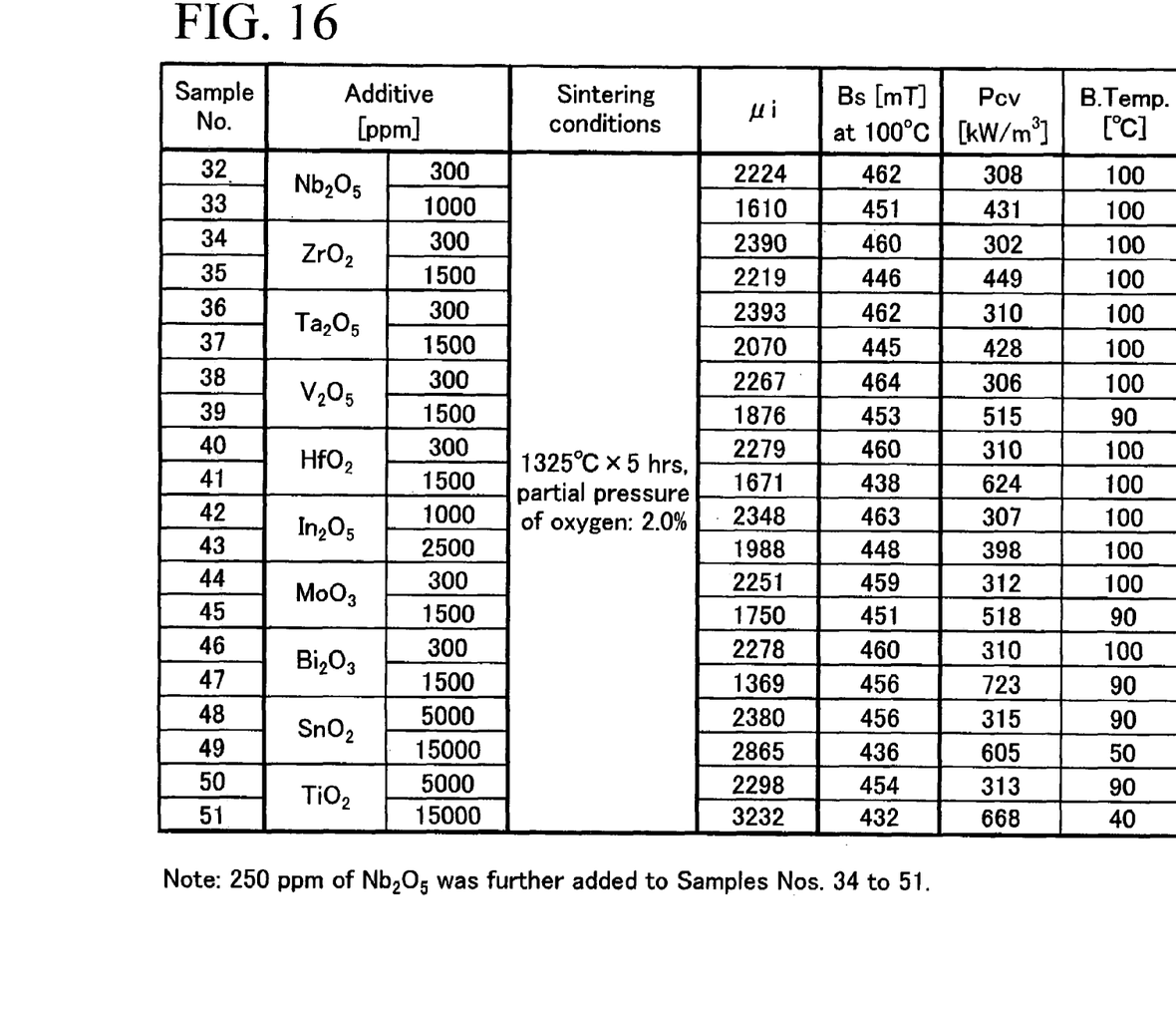
FIG. 16 is a table showing the magnetic properties and the like of the samples prepared in Example 3.
Figure 17:
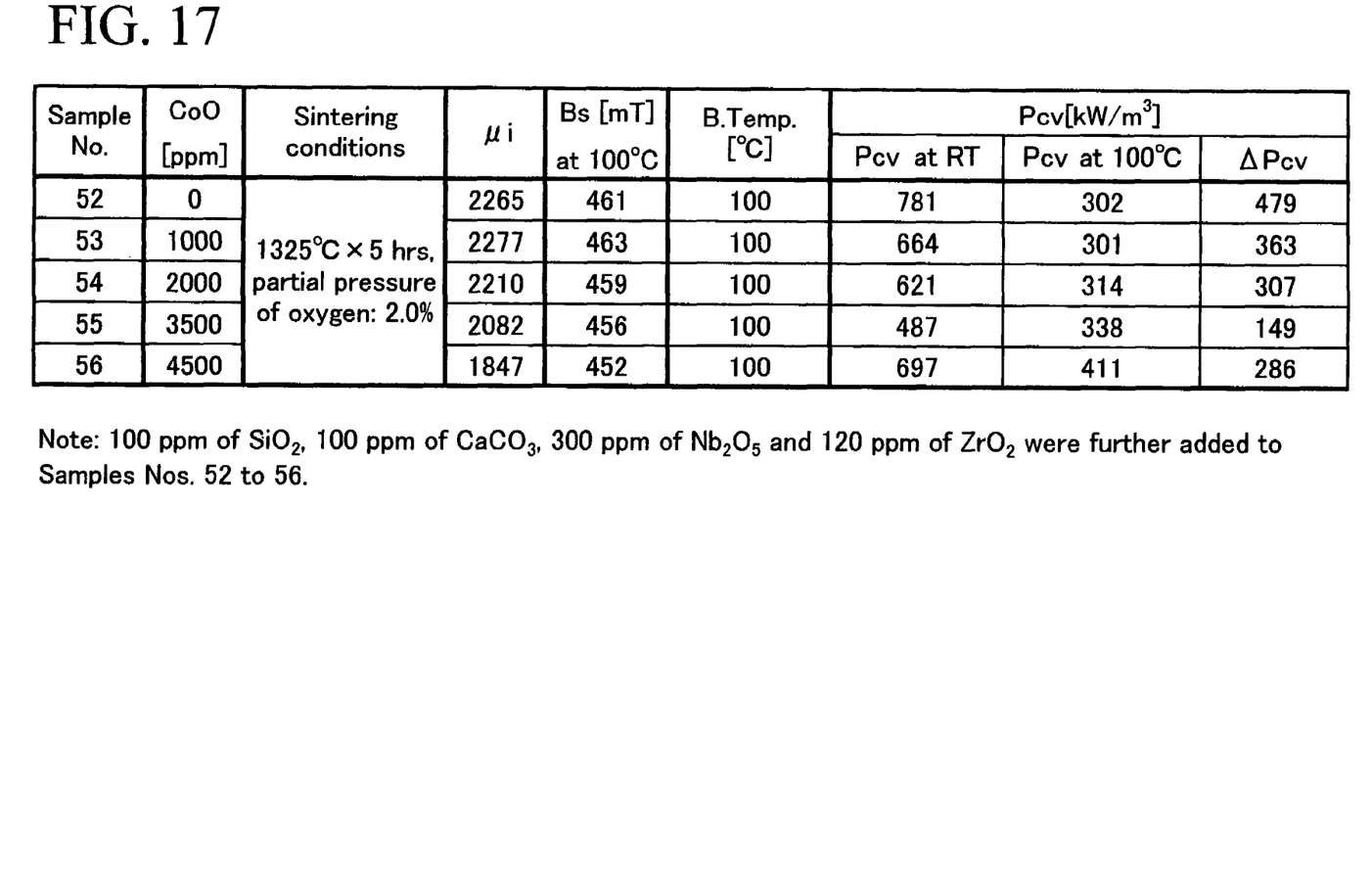
FIG. 17 is a table showing the magnetic properties and the like of the samples prepared in Example 3.

The Mn—Zn ferrites were prepared in the same way as in Example 1 except that the types and contents of the additives were set as shown in FIGS. 16 and 17. The properties of the ferrites were measured in the same manner as in Example 1. The results obtained are shown in FIGS. 16 and 17. Here, it is to be noted that the properties of the powders prior to sintering are as follows, and in FIG. 17, Pcv at RT denotes the loss at 25° C., Pcv at 100° C. denotes the loss at 100° C. and ΔPcv denotes the loss at 25° C.—the loss at 100° C.

BET: 2.5 to 4.0 $m^2/g$
50% particle size: 0.7 to 1.5 μm
90% particle size: 1.0 to 4.0 μm As shown in FIG. 16, the addition of the second and third additives can improve the saturation magnetic flux density (Bs) and/or can decrease the loss. However, excessive addition of the additives decreases the saturation magnetic flux density (Bs) and increases the loss, and accordingly, addition of the additives in appropriate ranges is desirable.

Additionally, as shown in FIG. 17, addition of CoO in an appropriate content can decrease the loss at the bottom temperature and can also decrease the ΔPcv.

What is claimed is:

1. A method for producing a Mn—Zn ferrite, comprising the steps of:
    compacting a powder having a specific surface area (based on the BET method) of 2.0 to 5.0 $m^2/g$ and a 50% particle size of 0.7 to 2.0 μm into a compacted body having a predetermined shape; and
    obtaining a sintered body by sintering said compacted body, wherein:
    said sintered body comprises, as main constitutuents, 54 to 57 mol % of $Fe_2O_3$, 5 to 10 mol % of ZnO, 1.5 to 4 mol % of NiO, and the balance substantially being MnO.

2. The method for producing a Mn—Zn ferrite according to claim 1, wherein:
    said powder to be compacted has said specific surface area of 2.5 to 4.0 $m^2/g$.

3. The method for producing a Mn—Zn ferrite according to claim 1, wherein:
    said powder to be compacted has said 50% particle size of 0.9 to 1.5 μm.

4. The method for producing a Mn—Zn ferrite according to claim 1, wherein:
    said powder to be compacted has a 90% particle size of 4.0 μm or less.

5. The method for producing a Mn—Zn ferrite according to claim 1, wherein:
    the sintering of said compacted body is carried out at a retention temperature of 1250 to 1450° C.

6. The method for producing a Mn—Zn ferrite according to claim 1, wherein:
    said sintered body comprises, as first additives, 60 to 250 ppm of Si in terms of $SiO_2$ and 700 to 2500 ppm of Ca in terms of $CaCO_3$.

7. The method for producing a Mn—Zn ferrite according to claim 1, wherein:
    said sintered body comprises, as second additives, one or more selected from the group consisting of CoO: 500 to 4000 ppm, $Nb_2O_5$: 50 to 500 ppm, $ZrO_2$: 50 to 1000 ppm, $Ta_2O_5$: 50 to 1000 ppm, $V_2O_5$: 50 to 1000 ppm, $HfO_2$: 50 to 1000 ppm, $In_2O_3$: 50 to 2000 ppm, $MoO_3$: 50 to 1000 ppm, and $Bi_2O_3$: 50 to 1000 ppm.

8. The method for producing a Mn—Zn ferrite according to claim 7, wherein:
    said sintered body comprises, as said second additive, at least CoO.

9. The method for producing a Mn—Zn ferrite according to claim 6, wherein:
    said sintered body comprises CoO: 500 to 4000 ppm, $Nb_2O_5$: 50 to 500 ppm and $ZrO_2$: 50 to 1000 ppm.

10. The method for producing a Mn—Zn ferrite according to claim 7, wherein:
    said sintered body comprises, as third additives, one or both of $SnO_2$ in a range between 500 and 10000 ppm and $TiO_2$ in a range between 500 and 10000 ppm.

11. The method for producing a Mn—Zn ferrite according to claim 1, wherein:
    said sintered body has a mean grain size of 5 to 35 μm.

12. The method for producing a Mn—Zn ferrite according to claim 1, wherein:
    said sintered body has a saturation magnetic flux density at 100° C. of 440 mT or more.

13. The method for producing a Mn—Zn ferrite according to claim 1, wherein:
    said sintered body has a bottom temperature of 85 to 120° C. at which the loss thereof is minimal and a minimum loss value (100 kHz, 200 mT) of 350 $kW/m^3$ or less.

14. A method for producing a Mn—Zn ferrite, comprising the steps of:
    compacting a powder having a specific surface area (based on the BET method) of 2.5 to 4.0 $m^2/g$, a 50% particle size of 0.9 to 1.5 μm and a 90% particle size of 4.0 μm or less into a compacted body having a predetermined shape; and obtaining a sintered body by sintering said compacted body at a retention temperature of 1250 to 1450° C., wherein:
    said sintered body comprises, as main constituents, 54 to 57 mol % of $Fe_2O_3$, 5 to 10 mol % of ZnO, 1.5 to 4 mol% of NiO, and the balance substantially being MnO.

15. A method for producing a Mn—Zn ferrite, comprising the steps of:
    compacting a powder having a specific surface area (based on the BET method) of 2.0 to 5.0 $m^2/g$ and a 50% particle size of 0.7 to 2.0 μm into a compacted body having a predetermined shape; and
    obtaining a sintered body by sintering said compacted body, wherein:
    said sintered body has a mean grain size of 5 to 35 μm, a saturation magnetic flux density at 100° C. of 440 mT or more, a bottom temperature of 85 to 120° C. at which the loss thereof is minimal and a minimum loss value (100 kHz, 200 mT) of 350 $kW/m^3$ or less and
    said sintered body comprises, as main constituents, 54 to 57 mol % of Fe2O3, 5 to 10 mol % of ZnO. 1.5 to 4 mol % of NiO, and the balance substantially being MnO.

16. The method for producing a Mn—Zn ferrite according to claim 14, wherein:
    said sintered body comprises; as first additives, 60 to 250 ppm of Si in terms of $SiO_2$ and 700 to 2500 ppm of Ca in terms of $CaCO_3$; and further comprises CoO: 500 to 4000 ppm, $Nb_2O_5$: 50 to 500 ppm and $ZrO_2$: 50 to 1000 ppm.

17. The method for producing a Mn—Zn ferrite according to claim 15, wherein:

said sintered body comprises; as first additives, 60 to 250 ppm of Si in terms of $SiO_2$ and 700 to 2500 ppm of Ca in terms of $CaCO_3$; and further comprises CoO: 500 to 4000 ppm, $Nb_2O_5$: 50 to 500 ppm and $ZrO_2$: 50 to 1000 ppm.

18. A method for producing a Mn—Zn ferrite, comprising the steps of:

compacting a powder having a specific surface area (based on the BET method) of 2.5 to 4.0 m²/g, a 50% particle size of 0.9 to 1.5 μm and a 90% particle size of 4.0 μm or less into a compacted body having a predetermined shape; and obtaining a sintered body by sintering said compacted body at a retention temperature of 1250 to 1450° C., wherein:

said sintered body comprises; as main constituents, 54 to 57 mol % of $Fe_2O_3$, 5 to 10 mol % of ZnO, 4 mol % or less (not inclusive of 0%) of NiO, and the balance substantially being MnO; as first additives, 60 to 250 ppm of Si in terms of $SiO_2$ and 700 to 2500 ppm of Ca in terms of $CaCO_3$; and further comprises CoO: 500 to 4000 ppm, $Nb_2O_5$: 50 to 500 ppm and $ZrO_2$: 50 to 1000 ppm; and said sintered body has a mean grain size of 5 to 35 μm, a saturation magnetic flux density at 100° C. of 440 mT or more, a bottom temperature of 85 to 120° C. at which the loss thereof is minimal and a minimum loss value (100 kHz, 200 mT) of 350 kW/m³ or less.

19. A method for producing a Mn—Zn ferrite, comprising the steps of:

compacting a powder having a specific surface area (based on the BET method) of 2.0 to 5.0 m²/g and a 50% particle size of 0.7 to 2.0 μm into a compacted body having a predetermined shape; and obtaining a sintered body by sintering said compacted body, wherein:

said sintered body comprises, as main constituents, 54 to 57 mol % of $Fe_2O_3$, 5 to 10 mol % of ZnO, 4 mol % or less (not inclusive of 0%) of NiO, and the balance substantially being MnO, and further comprises CoO: 500 to 4000 ppm.

* * * * *